US005144276A

United States Patent [19]
Bertin et al.

[11] Patent Number: 5,144,276
[45] Date of Patent: Sep. 1, 1992

[54] ROTARY POTENTIOMETER

[75] Inventors: Patrice Bertin, Mery-sur-Oise; Roger Texier, La Courneuve, both of France

[73] Assignee: Valeo, Paris, France

[21] Appl. No.: 506,814

[22] Filed: Apr. 10, 1990

[30] Foreign Application Priority Data

Apr. 13, 1989 [FR] France .................................. 89 04890

[51] Int. Cl.⁵ ............................................ H01C 10/32
[52] U.S. Cl. ................................... 338/162; 338/166; 338/196; 338/333
[58] Field of Search ............... 338/162, 163, 164, 160, 338/161, 165, 166, 167, 168, 169, 170, 171, 172, 173, 174, 175, 333, 190–193, 196, 73, 132

[56] References Cited

U.S. PATENT DOCUMENTS 3,699,493 10/1972 Oka et al. ............................ 338/132
4,123,740 10/1978 Palmer et al. ................... 338/172 X
4,652,850 3/1987 Oka .................................... 338/160
4,817,419 4/1989 Iden .............................. 338/176 X Primary Examiner—Marvin M. Lateef
Attorney, Agent, or Firm—Longacre & White

[57] ABSTRACT

A potentiometer includes a rotatably mounted lever which acts as a follower member adapted to lie in contact with a moveable finger, the movement of which the lever is to follow, the lever being biassed at all times towards the finger by resilient return means.

The lever is in the form of a fork having two arms whereby it is adapted to embrace the finger. Whichever one of these arms is in the trailing position with respect to the direction of rotation in which the lever is biassed by the return means is longer than the other arm. In the embodiment described, the longer arm is an active arm, the shorter arm being a security arm.

8 Claims, 1 Drawing Sheet 5,144,276

ROTARY POTENTIOMETER

FIELD OF THE INVENTION

This invention is concerned with rotary potentiometers, that is to say potentiometers of the kind comprising a rotatably mounted lever, for acting as a follower member and being adapted to lie in contact with a moveable finger, the movement of which it is to follow, and resilient return means adapted to bias the lever permanently towards the said finger. Such a potentiometer will be referred to as a potentiometer of the kind specified.

BACKGROUND OF THE INVENTION

As described in U.S. Pat. No. 4,829,221 and the corresponding French published patent application FR 2 609 562A, a potentiometer of this kind is particularly applicable in the control of an actuator for controlling a clutch of an automotive vehicle, in which the potentiometer acts as a sensor for giving certain information that is required for such control. However, at the present time the lever which it includes is formed only as a single arm, and it is thus in simple engagement through this arm against the finger which is to be followed. With this arrangement, jamming of the bearing of this lever is sometimes experienced, and this gives rise to loss of contact between it and the finger which it is supposed to follow. Consequently, the potentiometer, acting as a sensor, then gives wrong information.

DISCUSSION OF THE INVENTION

An object of the present invention is to provide a potentiometer not having the above disadvantage.

In accordance with the invention, in general terms, in a potentiometer of the kind specified, the lever is in the form of a fork comprising a first arm and a second arm, together adapted to lie on either side of the finger, the first arm being to the rear of the second arm in relation to the direction of rotation in which the lever is biassed by the said resilient return means, and the first arm being longer than the second arm.

One of the arms of the fork constitutes an active arm adapted to lie normally in contact with the finger which is to be followed. The other arm is a security arm which, under the biasing action of the finger, is adapted to act on the lever so as to break any jamming that may occur between the lever and its bearing.

In this way, when the potentiometer is mounted in position in a blind scooping movement, the risk of not seeing the lever come into incorrect engagement, through its security arm, on the finger to be followed, which would introduce a positive error in information subsequently transmitted by the potentiometer, is avoided.

These features, as well as others, and their advantages, will appear more clearly from the description which follows, which is given by way of example only and with reference to the accompanying diagrammatic drawings.

DESCRIPTION OF A PREFERRED EMBODIMENT OF THE INVENTION

Figure 1:
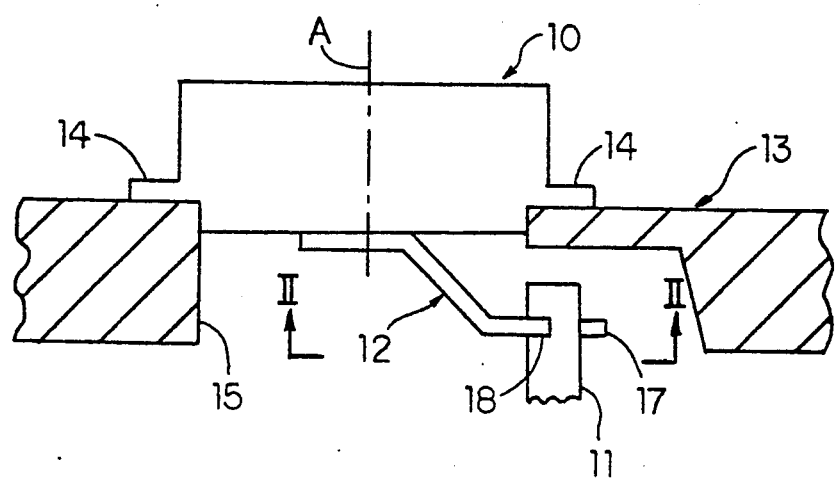
FIG. 1 is a view in elevation showing a rotary potentiometer in accordance with the invention.
Figure 2:
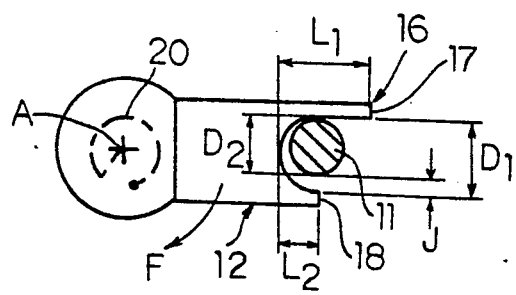
FIG. 2 is a view taken in partial transverse cross section of the invention shown in FIG. 1.
Figure 3:
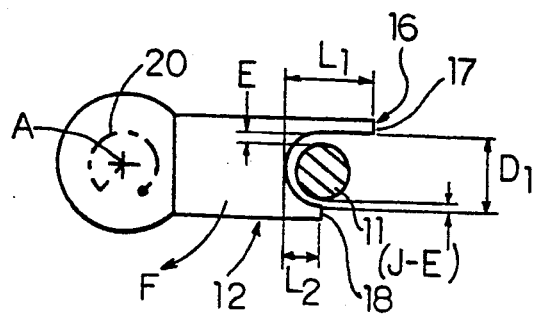
FIG. 3 is a view similar to that of FIG. 2 for the invention shown in FIG. 1.

The potentiometer 10 in accordance with the invention is of the kind which includes a lever 12, for acting as a follower member which engages, and is adapted to remain in contact with, a moveable finger 11. In this example the finger 11 is a cylindrical finger having a circular transverse contour, the movement of which is to be followed. In practive, this movement is a circular movement about an axis A. The lever 12 is mounted for rotation about the same axis A, and is biased by resilient return means 20. In this example, the latter comprise a simple torsion spring adapted to bias the lever 12 permanently towards the finger 11, as indicated by the arrow F in FIG. 2.

In this example, the finger 11 operates inside a casing 13, being for example carried on the latter by means of two ears 14. The potentiometer is so oriented that the axis A is parallel to the finger 11, so that when, during assembly, the lever 12 is engaged on the finger 11, it is introduced through an opening 15 formed in the casing 13, and engaged with the finger in a blind scooping movement. To the extent that the structure as so far described is well known per se, it will not be described here in any greater detail.

The lever 12 is in the form of a fork 16 having two arms 17 and 18, by which it is able to embrace the finger 11. Of the arms 17 and 18, the one which is trailing in the direction of rotation, indicated by the arrow F in FIG. 2 (in which direction the lever 12 is biassed by the resilient return means 20) is longer than the other one of these arms. In the present example, the arm 17, or active arm, is longer than the arm 18, or security arm.

In this example, these arms 17 and 18 are generally parallel with each other, and those of their surfaces which lie with one facing the other are also parallel to each other.

If L1 is the length of the active arm 17, and L2 is that of the security arm 18, with respect to the root of the fork 16 which they constitute, then $$L1 > L2.$$

Thus, during the scooping movement which characterises the positioning of the potentiometer 10, it is of necessity the active arm 17 that first comes into contact with the finger 11. Since the lever 12 is thus guided by the active arm 17 towards the finger 11, it must then come into engagement on the finger 11, thereby embracing the latter; though it should be noted that a mounting clearance is of course necessary between the two arms 17 and 18 and the finger 11 which is to be followed.

In a modification, the clearance between the follower member 12 and the finger 11 is turned to further good use in that, as described in the document FR-A-2 609 562, a relationship is established between the displacement of the finger 11, the position of which is for example representative of the position of the clutch pedal, and a series of calibrated electrical control pulses, each one of which corresponds to a distinct elementary value E of displacement. In accordance with the invention, the distance D1 between the two arms 17 and 18 of the lever 12 is made greater than the corresponding dimension D2 of the finger 11, i.e. its diameter in this example, by an amount J lying between one and two times the elementary displacement.

In other words:

$$E < J < 2E.$$

The clearance J, which is thus deliberately increased, enables the potentiometer to give, as one of the above-mentioned items of information, a special signal indicating when jamming occurs between the lever 12 and its bearing. This special signal, of which use can be made to great advantage in operation, arises from the fact that during such jamming, the first electrical control pulse applied to the finger 11 will not bring the latter into contact with the security arm 18, while the clearance separating it initially from the security arm 18 is greater than the corresponding elementary displacement E; it is then only during the course of the elementary displacement E corresponding to the next following electrical pulse that, with the clearance J then being taken up, the finger 11 comes into engagement on the security arm 18. When it does so, it positively drives the lever 12, so as to tend to break its jam against the bearing.

Thus, if it should happen that the signal delivered by the potentiometer 10 remains stationary during an electrical control pulse, while its normal course is resumed on the next following electrical control pulse, it may be deduced from this that the lever 12 of the said potentiometer 10 is jammed and that this must be corrected.

The present invention is of course not limited to the embodiment described and shown, but embraces any variant.

What is claimed is:

1. A rotary potentiometer acting as a sensor comprising a moveable finger, a lever, means mounting the lever rotatably and in contact with said finger, whereby the lever acts as a follower member adapted to the movement of the said finger, and resilient return means rotatably biasing the lever permanently towards the finger, wherein the lever is in the form of a fork comprising a first arm adapted to lie in contact with the moveable finger which is to be followed and a second arm, together adapted to lie on either side of the finger, the first arm being to the rear of the second arm in relation to the direction of rotation in which the lever is biased by the resilient return means, and the first arm being longer than the second arm, and wherein, when a relationship has been established between the displacement of the finger and calibrated electrical control pulses, each corresponding to a particular elementary displacement, the distance between the first and second arms of the lever is made greater than a corresponding dimension of said finger by an amount lying between one and two times said elementary displacement in such a way that the signal delivered by the potentiometer remains stationary during an electrical pulse, while its normal course is resumed on the next following electrical control pulse and it may be deduced from this that the said lever of said potentiometer is jammed and that this must be corrected.

2. An apparatus comprising:
a rotary potentiometer (10) having a rotatable lever (12), said rotatable lever (12) being mounted for rotational movement about an axis (A), said rotatable lever (12) defining the form of a fork and comprising a first arm (17) and a second arm (18);
a finger (11) which is moveable in a circular direction about said axis (A), said finger (11) being embraced between the first arm (17) and the second arm (18) of said rotatable lever (12);
resilient return means (20) for rotatably and resiliently biasing the first arm (17) of the rotatable lever (12) against the finger (11), whereby circular movement of the finger (11) about the axis (A) is followed by the rotatable lever (12); wherein
the first arm (17) of the rotatable lever (12) is longer than the second arm (18) of the rotatable lever, whereby during an initial positioning of the lever (12) relative to the finger (11), the first arm (17) comes into contact with the finger (11) and the lever (12) is thus guided by the first arm (17) towards the finger 3. An apparatus as recited in claim 2, wherein the finger (11) has a circular transverse cross-section, wherein a relationship is established between a displacement of the finger (11) and a series of electrical control pulses such that each control pulse corresponds to an elementary displacement (E) of the finger 11, and wherein a distance (D1) between the first and second arms (17 and 18) is made greater than a diameter (D2) of the circular transverse cross-section of the finger (11) by an amount lying between one and two times the elementary displacement (E).

4. An apparatus as recited in claim 2, further comprising a casing (13), wherein an opening (15) is provided in the casing (13) and means (14) are provided for mounting the potentiometer (10) over the opening (15) in the casing (13), characterized in that, during assembly, the lever (12) is introduced through the opening (15) and engaged with the finger (11) in a blind scooping movement, while the relative lengths of said first and second arms of the lever (12) avoid incorrect engagement with the finger (11).

5. An apparatus as recited in claim 2, wherein the first and second arms (17 and 18) extend generally parallel to each other from a root of the fork (16) in the rotatable lever (12) such that $$L1 > L2,$$

wherein L1 is the length of the first arm (17) and L2 is the length of the second arm (18), with the respect of the root of the fork (16) from which they extend.

6. An apparatus comprising a moveable finger, a potentiometer having a rotatable lever, means for mounting the lever in contact with said moveable finger such that the lever acts as a follower member adapted to follow the movement of the said moveable finger, and resilient return means rotatably and resiliently biasing the lever into contact with the finger, wherein the lever is in the form of a fork having a first arm and a second arm, wherein the first arm is adapted to lie in contact with the moveable finger, wherein the first and second arms embrace the finger, the first arm being to the rear of the second arm in relation to the direction of rotation in which the lever is resiliently biased by the resilient return means, and wherein the first arm is longer than the second arm.

7. An apparatus as recited in claim 6, wherein, when a relationship has been established between the displacement of the finger and calibrated electrical control pulses, each corresponding to a particular elementary displacement, a distance between the first and second arms of the lever is made greater than a corresponding dimension of the said finger embraced by said first and second arms by an amount lying between one and two times said elementary displacement in such a way that if the signal delivered by the potentiometer remains stationary during an electrical pulse, while its normal course is resumed on the next following electrical control pulse, it may be deduced from this that the said lever of said potentiometer is jammed and that this must be corrected.

8. An apparatus as recited in claim 6, wherein the first and second arms extend generally parallel to each other from a root of the fork in the rotatable lever such that $$L1 > L2,$$

wherein L1 is the length of the first arm and L2 is the length of the second arm, with the respect of the root of the fork from which they extend.

* * * * *